(12) United States Patent
Chang

(10) Patent No.: US 6,446,655 B1
(45) Date of Patent: Sep. 10, 2002

(54) FAUCET ASSEMBLY WITH INDEPENDENT CONTROLS FOR TEMPERATURE AND FLOW RATE

(75) Inventor: Ta-Chun Chang, Taichung Hsien (TW)

(73) Assignee: Globe Union Industrial Corporation, Taichung (TW)

( * ) Notice: Subject to any disclaimer, the term of this patent is extended or adjusted under 35 U.S.C. 154(b) by 0 days.

(21) Appl. No.: 09/803,137

(22) Filed: Mar. 12, 2001

(51) Int. Cl.$^7$ ............................................. G05D 11/03
(52) U.S. Cl. ........................................ 137/100; 137/597
(58) Field of Search .......................... 137/98, 100, 607, 137/597, 876

(56) References Cited

U.S. PATENT DOCUMENTS

| | | | | |
|---|---|---|---|---|
| 4,243,063 A | * | 1/1981 | Parkison | 137/100 |
| 4,628,962 A | * | 12/1986 | Pezzarossi | 137/597 |
| 5,048,792 A | * | 9/1991 | Fischer | 137/597 |
| 5,344,067 A | * | 9/1994 | Axelsson et al. | 137/607 |
| 5,884,652 A | * | 3/1999 | Yeh et al. | 137/597 |

* cited by examiner

*Primary Examiner*—Stephen Hepperle
(74) *Attorney, Agent, or Firm*—Pillsbury Winthrop, LLP

(57) ABSTRACT

A faucet assembly includes a body, a pressure-stabilizing device, a temperature adjustment device, a flow-rate control valve, and a faucet end unit. The pressure-stabilizing device is disposed between a pair of cold-water and hot-water input passages and a pair of cold-water and hot-water output passages so as to permit flow of cold water and hot water from the cold-water and hot-water input passages into cold-water and hot-water inlets in the temperature adjustment device through the cold-water and hot-water output passages at the same flow rate even when the water pressures in the cold-water and hot-water input passages are different. The cold and hot water flow from the cold-water and hot-water inlets to a water discharge port at a ratio, which can be selected by rotating a rotary knob, thereby feeding a selected temperature of water to the faucet end unit. The flow-rate control valve is disposed between the temperature adjustment device and the faucet end unit. As such, the temperature of water from the faucet end unit can be controlled independently of the flow rate.

5 Claims, 10 Drawing Sheets

FAUCET ASSEMBLY WITH INDEPENDENT CONTROLS FOR TEMPERATURE AND FLOW RATE

BACKGROUND OF THE INVENTION

1. Field of the Invention

This invention relates to a faucet assembly, more particularly to a faucet assembly, which is provided with a single temperature adjusting rotary knob and a single flow-rate adjusting rotary knob, thereby controlling independently the temperature and flow rate of water.

2. Description of the Related Art

Referring to FIG. 1, a faucet assembly is shown to include a faucet end 1, a showerhead 2, a cold-water control knob 3, a hot-water control knob 4, and a selection button 5 for selecting the discharge of water from the faucet end 1 or the showerhead 2, which are disposed on a wall of a bathroom. To obtain a predetermined temperature and a predetermined flow rate of warm water for bathing, the knobs 3, 4 have to be rotated to determine the temperature and flow rate of water from the faucet end 1 or the showerhead 2. As a result, the conventional faucet assembly suffers from the following disadvantages:

1. Dependent Control of Water Temperature and Flow Rate

When either of the knobs 3, 4 is rotated, the water temperature and flow rate are varied simultaneously, thereby resulting in difficulties in control thereof.

2. Inconvenient Operation

When it is desired to adjust only one of the water temperature and flow rate, both of the knobs 3, 4 have to be operated.

3. Lack of Safety

During adjustment of the knobs 3, 4, because it is difficult to control the water temperature, the water from the faucet end 1 or showerhead 2 may be relatively hot, thereby resulting in scalding of the skin of the user.

SUMMARY OF THE INVENTION

An object of this invention is to provide a faucet assembly with independent controls for water temperature and flow rate.

According to this invention, a faucet assembly includes a body, a pressure-stabilizing device, a temperature adjustment device, a flow-rate control valve, and a faucet end unit. The pressure-stabilizing device is disposed between a pair of cold-water and hot-water input passages and a pair of cold-water and hot-water output passages so as to permit flow of cold water and hot water from the cold-water and hot-water input passages into cold-water and hot-water inlets in the temperature adjustment device through the cold-water and hot-water output passages at the same flow rate even when the water pressures in the cold-water and hot-water input passages are different. The cold and hot water flow from the cold-water and hot-water inlets to a water discharge port at a ratio, which can be selected by rotating a rotary knob, thereby feeding a selected temperature of water to the faucet end unit. The flow-rate control valve is disposed between the temperature adjustment device and the faucet end unit. As such, the temperature of water from the faucet end unit can be controlled independently of the flow rate.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
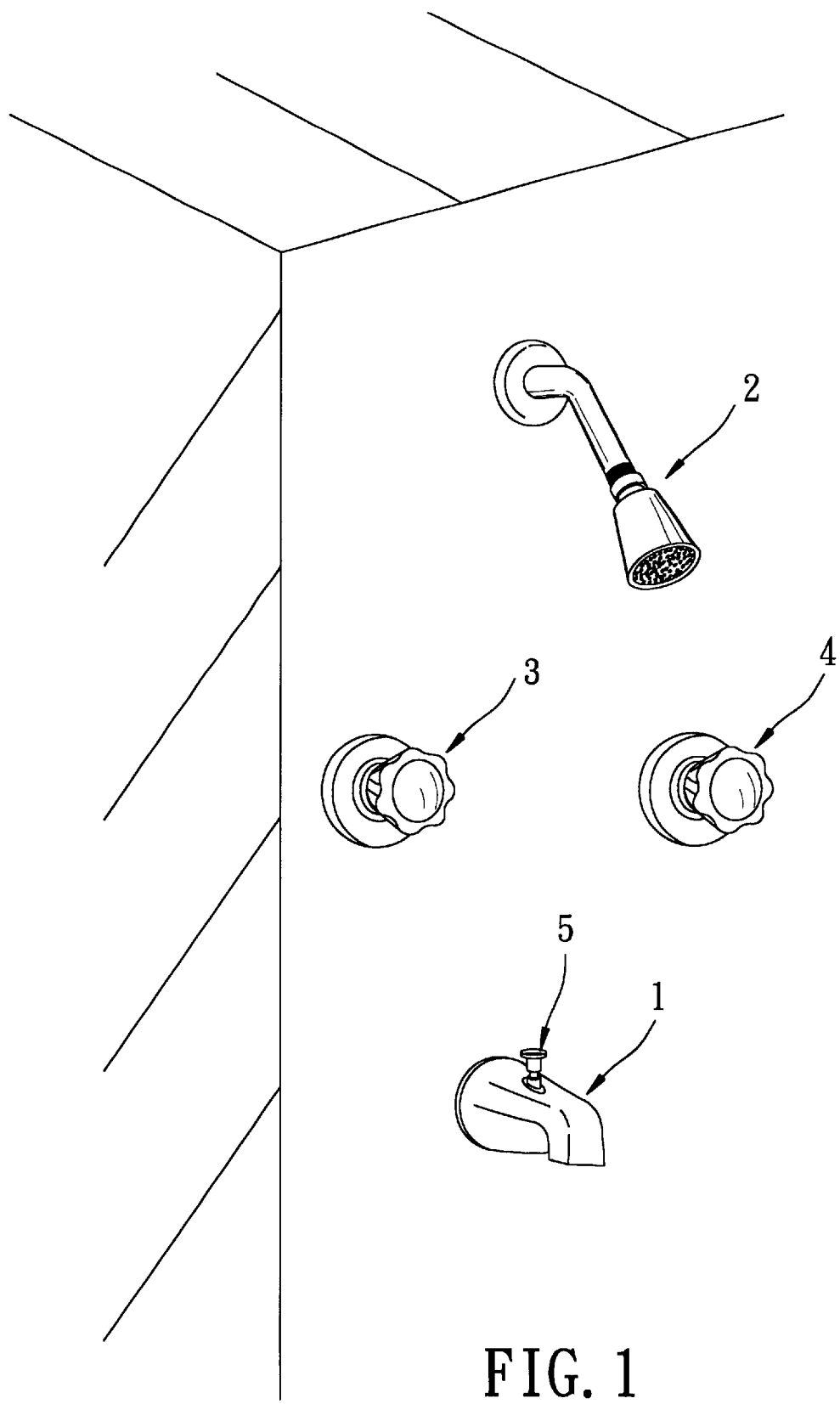
FIG. 1 is a schematic view of a conventional faucet assembly.
Figure 2:
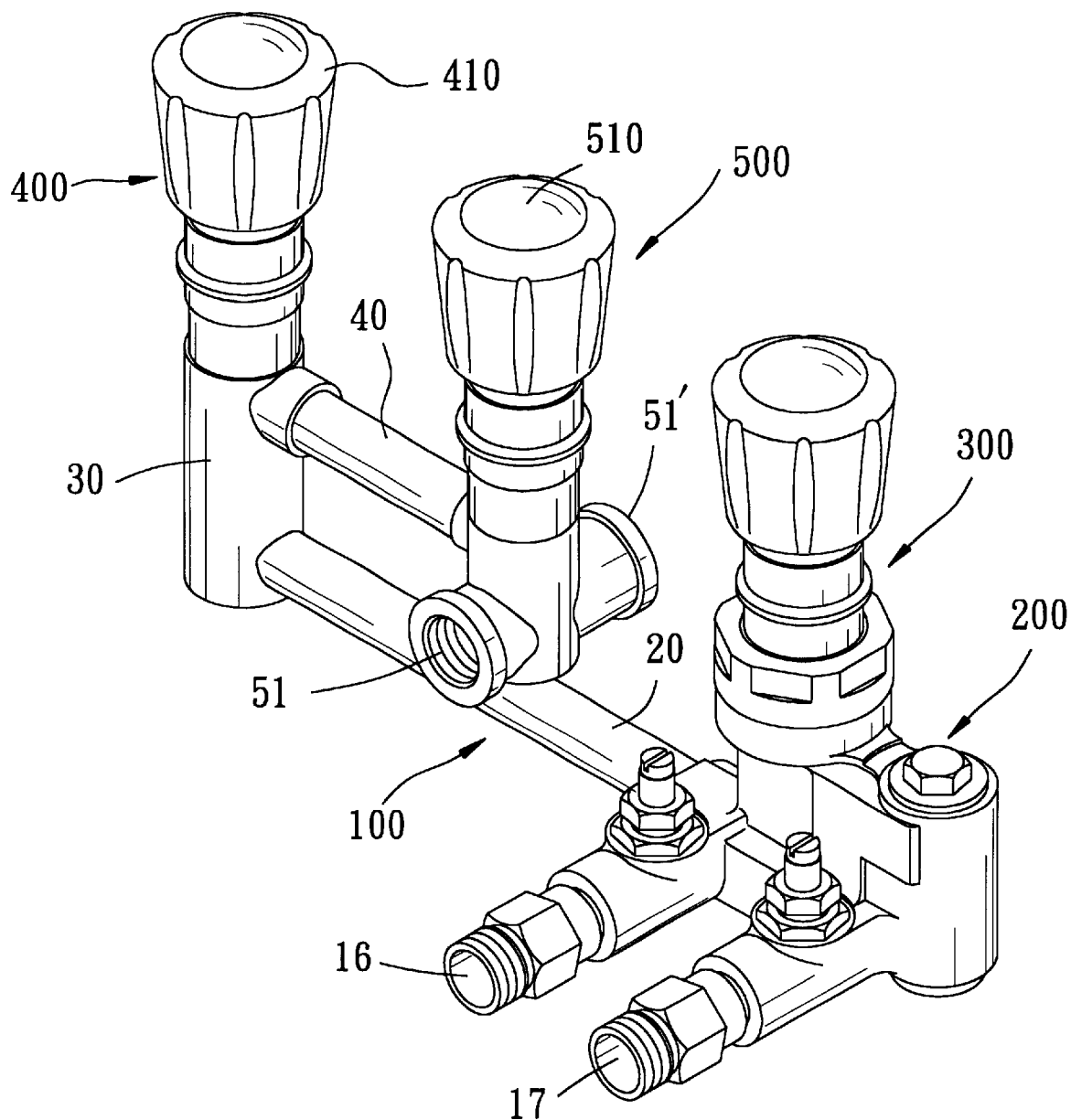
FIG. 2 is a fragmentary perspective view of the preferred embodiment of a faucet assembly according to this invention.
Figure 3:
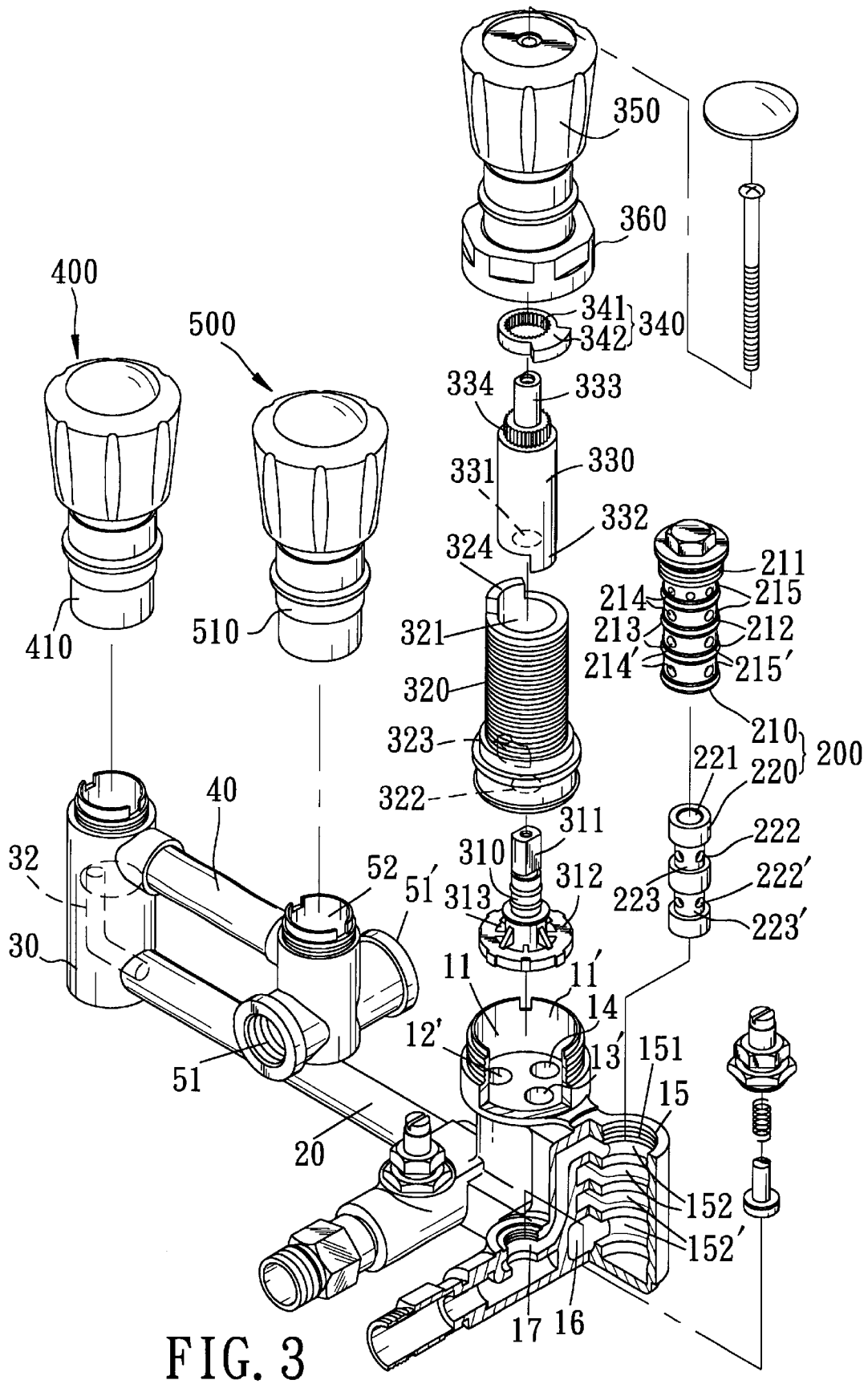
FIG. 3 is a partly exploded fragmentary view of the preferred embodiment.
Figure 4:
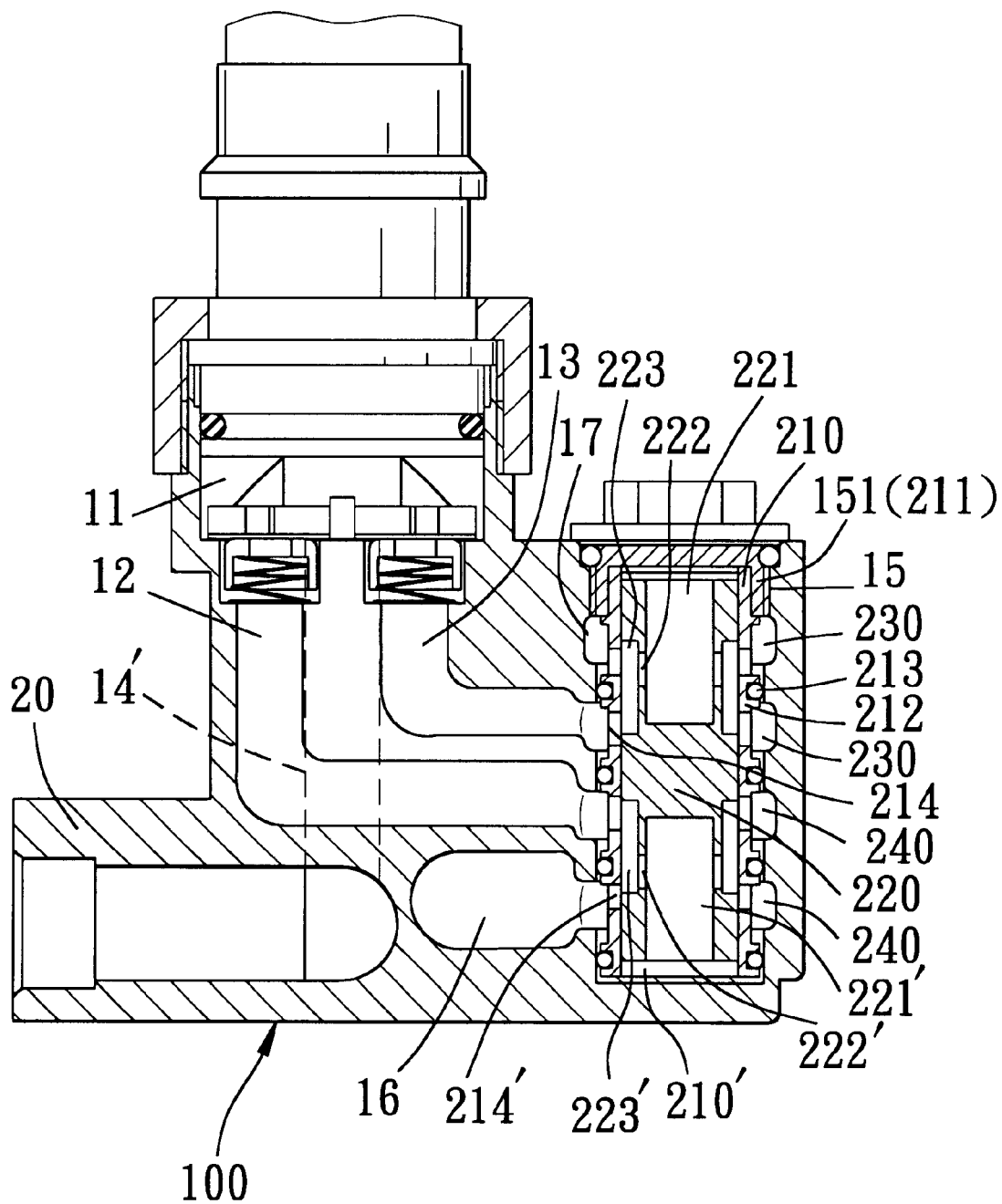
FIG. 4 is a sectional view of a body of the preferred embodiment.

Referring to FIGS. 2, 3, and 4, the preferred embodiment of a faucet assembly according to this invention is shown to include a body 100, a pressure-stabilizing device 200, a temperature adjustment device 300, a flow-rate control valve or device 400, and an outlet selecting device 500. The temperature adjustment device 300 is in fluid communication with the flow-rate control device 400 via a lower horizontal conduit 20 and a vertical conduit 30. The vertical conduit 30 has a vertical passage 32 (see FIG. 7) formed therethrough. The flow-rate control device 400 is in fluid communication with the outlet selecting device 500 via an upper horizontal conduit 50, in which a horizontal passage 33 (see FIG. 7) is formed.

The body 100 has a hot-water output passage 12, a cold-water output passage 13, a hot-water input passage 16, and a cold-water input passage 17.

The pressure-stabilizing device 200 is disposed between the cold-water input and output passages 17, 13 and between the hot-water input and output passages 16, 12 so that the cold-water and hot-water output passages 12, 13 have the same flow rate even when the cold-water and hot-water input passages 16, 17 have different water pressures.

The temperature adjustment device 300 includes a seat member 11 and an adjustment member 310. The seat member 11 has a hot-water inlet 12' in fluid communication with the hot-water output passage 12, a cold-water inlet 13' in fluid communication with the cold-water output passage 13, and a water discharge port 14 in fluid communication with the lower horizontal conduit 20 via a vertical passage 14'. The adjustment member 310 is disposed rotatably relative to the seat member 11, and has a lower end portion 312 with a connecting passage 313 (see FIGS. 3, 6A, and 6B), which is shaped so that rotation of the adjustment member 310 relative to the seat member 11 causes variation of engaging areas between the cold-water inlet 13' and the connecting passage 313 and between the hot-water inlet 12' and the connecting passage 313, thereby permitting flow of a first predetermined amount of the cold water from the cold-water inlet 13' to the water discharge port 14 and a second predetermined amount of the hot water from the hot-water inlet 12' to the water discharge port 14 and consequently varying water temperature in the water discharge port 14.

A faucet end unit 51 is in fluid communication with the water discharge port 14 in the temperature adjustment device 300 via the passages 14', 32, 33.

The flow-rate control valve 400 is disposed operatively between the temperature adjustment device 300 and the faucet end unit 51 for controlling flow rate of water from the water discharge port 14 to the faucet end unit 51.

The body 100 has a hollow vertical cylindrical portion 15 with an inner surface that is formed with an adjacent pair of first inner annular grooves 152 and an adjacent pair of second inner annular grooves 152'. The first and second inner annular grooves 152, 152' in the cylindrical portion 15 of the body 100 are arranged one above another.

The pressure-stabilizing device 200 includes a fixing tube 210 and a cylindrical regulating valve member 220. The fixing tube 210 is fixed within the cylindrical portion 15 of the body 100 by engagement between an internally threaded portion 151 and an externally threaded portion 211, and has a valve chamber 210' (see FIG. 4) therein, a wall which is formed with two first opening units 214 and two second opening units 214', and an outer surface, which is formed with an adjacent pair of first outer annular grooves 215 and an adjacent pair of second outer annular grooves 215'. The grooves 215, 215' are defined by annular rib units 212, and are aligned and are in fluid communication with the first and second inner annular grooves 152, 152' in the cylindrical portion 15 of the body 10, respectively, so as to define an adjacent pair of first annular passage chambers 230 and an adjacent pair of second annular passage chambers 240. Each of the ribs 212 is formed with an annular groove, within which a seal ring 213 is confined, so that a liquid-tight seal is established between each adjacent pair of the first and second annular passage chambers 230, 240. Each of the first and second annular passage chambers 230, 240 is formed between the inner surface of the cylindrical portion 15 of the body 100 and the outer surface of the fixing tube 210, and is formed from one of the first and second outer annular grooves 215, 215' in the fixing tube 210 and one of the first and second inner annular grooves 152, 152' in the cylindrical portion 15 of the body 10, which are aligned with each other. The first and second opening units 214, 214' of the fixing tube 21 are in fluid communication with the first and second annular passage chambers 230, 240, respectively. Each of the opening units 214, 214' includes a plurality of openings.

Figure 5A:
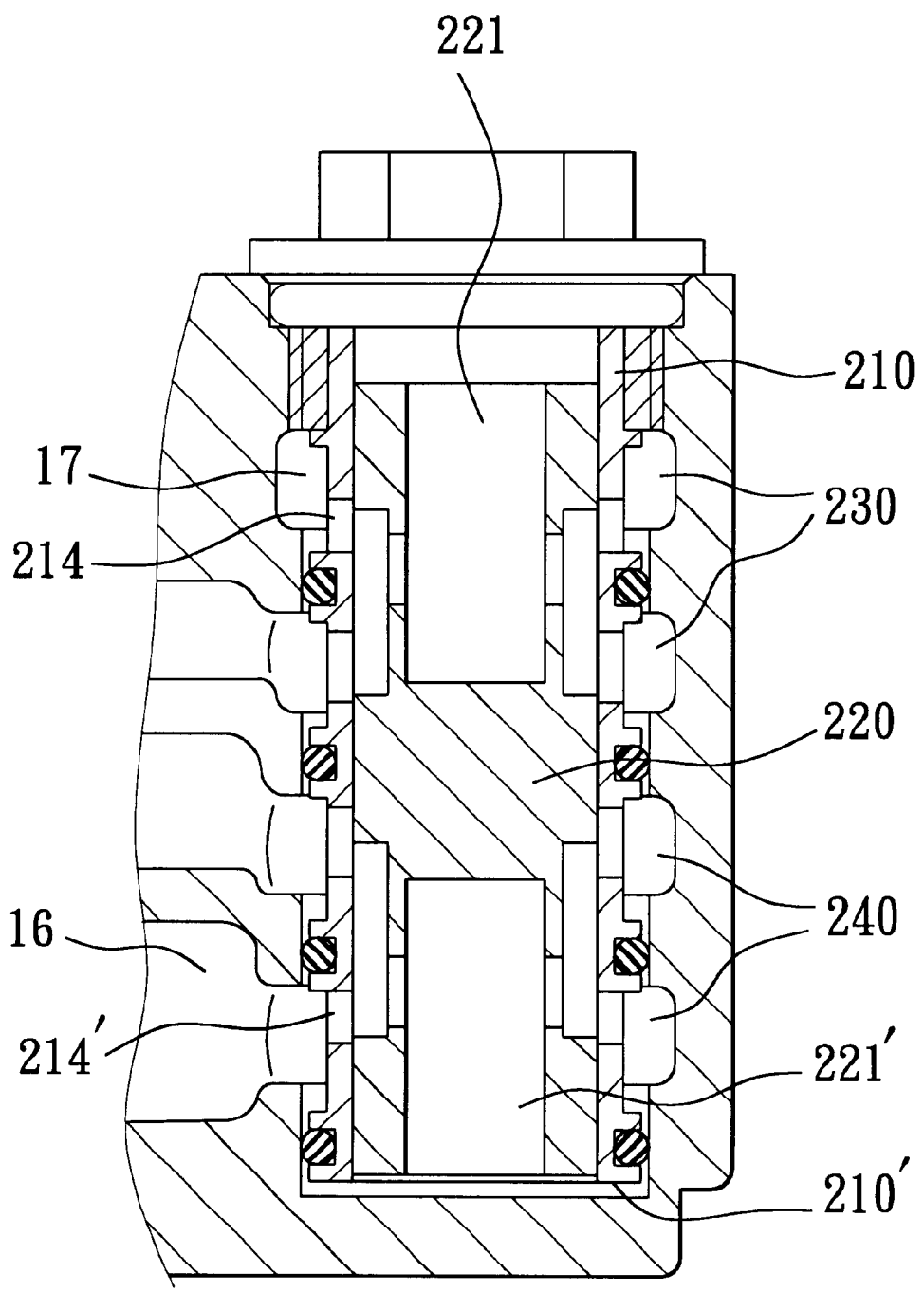
FIG. 5A is a sectional view of a pressure-stabilizing device of the preferred embodiment when a valve member is disposed at an equilibrating position.

The valve member 220 is disposed movably within the valve chamber 210' in the fixing tube 210, and has an outer surface that is formed with a first outer annular groove 223 and a second outer annular groove 223'. The first annular passage chambers 230 are in fluid communication with the first outer annular groove 223 in the valve member 220 via the first opening units 214 in the fixing tube 210, respectively. The second annular passage chambers 240 are in fluid communication with the second outer annular groove 223' in the valve member 220 via the second opening units 214' in the fixing tube 210, respectively. The cold-water input and output passages 17, 13 are communicated respectively and fluidly with the first annular passage chambers 230. The hot-water input and output passages 16, 12 are communicated respectively and fluidly with the second annular passage chambers 240. The valve member 220 further has a first end surface that is formed with a cylindrical first bore 221, a second end surface that is formed with a cylindrical second bore 221', and a wall that is formed with a first opening unit 222 and a second opening unit 222'. Each of the first and second opening units 222, 222' includes a plurality of openings. The first and second bores 221, 221' are isolated fluidly from each other. The first bore 221 is in fluid communication with the first outer annular groove 223 in the valve member 220 via the first opening unit 222 in the valve member 220. The second bore 221' is in fluid communication with the second outer annular groove 223' in the valve member 220 via the second opening unit 222' in the valve member 220. When the hot-water and cold-water input passages 16, 17 have the same water pressure, the valve member 220 is disposed at an equilibrating position shown in FIG. 5A so that the hot-water and cold-water output passages 12, 13 have the same flow rate.

Figure 5B:
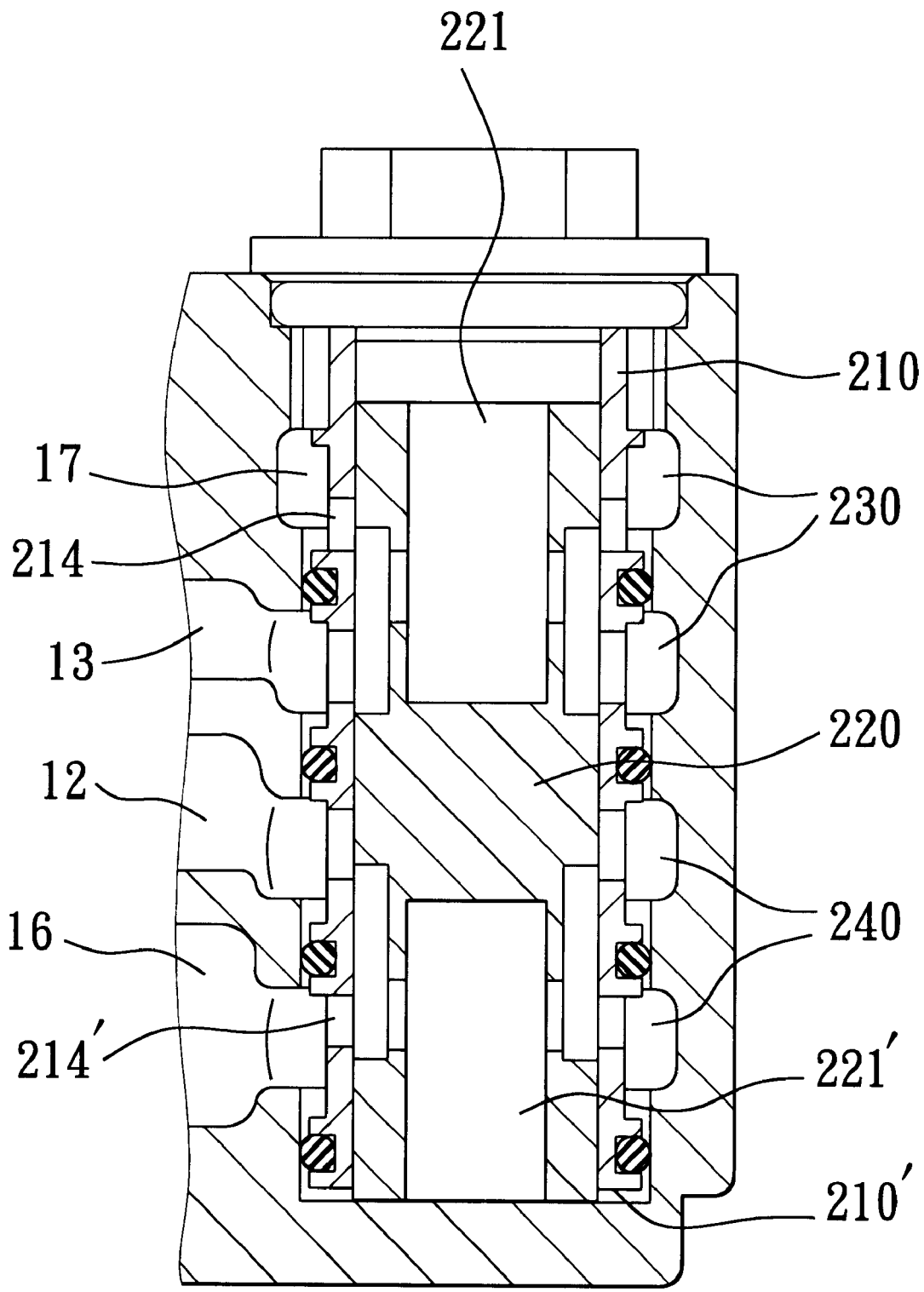
FIG. 5B is a sectional view of the pressure-stabilizing device of the preferred embodiment when the valve member is disposed at its lower limit position.

When the water pressure in the cold-water input passage 17 is larger than that in the hot-water input passage 16, the amount of entrance water in the first bore 221 is larger than that in the second bore 221' so that the valve member 220 moves downward to engage the second end of the valve chamber 210' (see FIG. 4) in the fixing tube 210, as shown in FIG. 5B. Under this condition, the engaging area between the valve member 220 and the upper one of the first opening units 214 in the fixing tube 210 is increased, while that between the valve member 220 and the lower one of the second opening units 214' in the fixing tube 210 is reduced. Accordingly, the amount of entrance water in the first bore 221 is smaller than that in the second bore 221' so that the water pressure in the second bore 221' is larger than that in the first bore 221, thereby pushing the valve member 220 back to the equilibrating position shown in FIG. 5A.

Figure 5C:
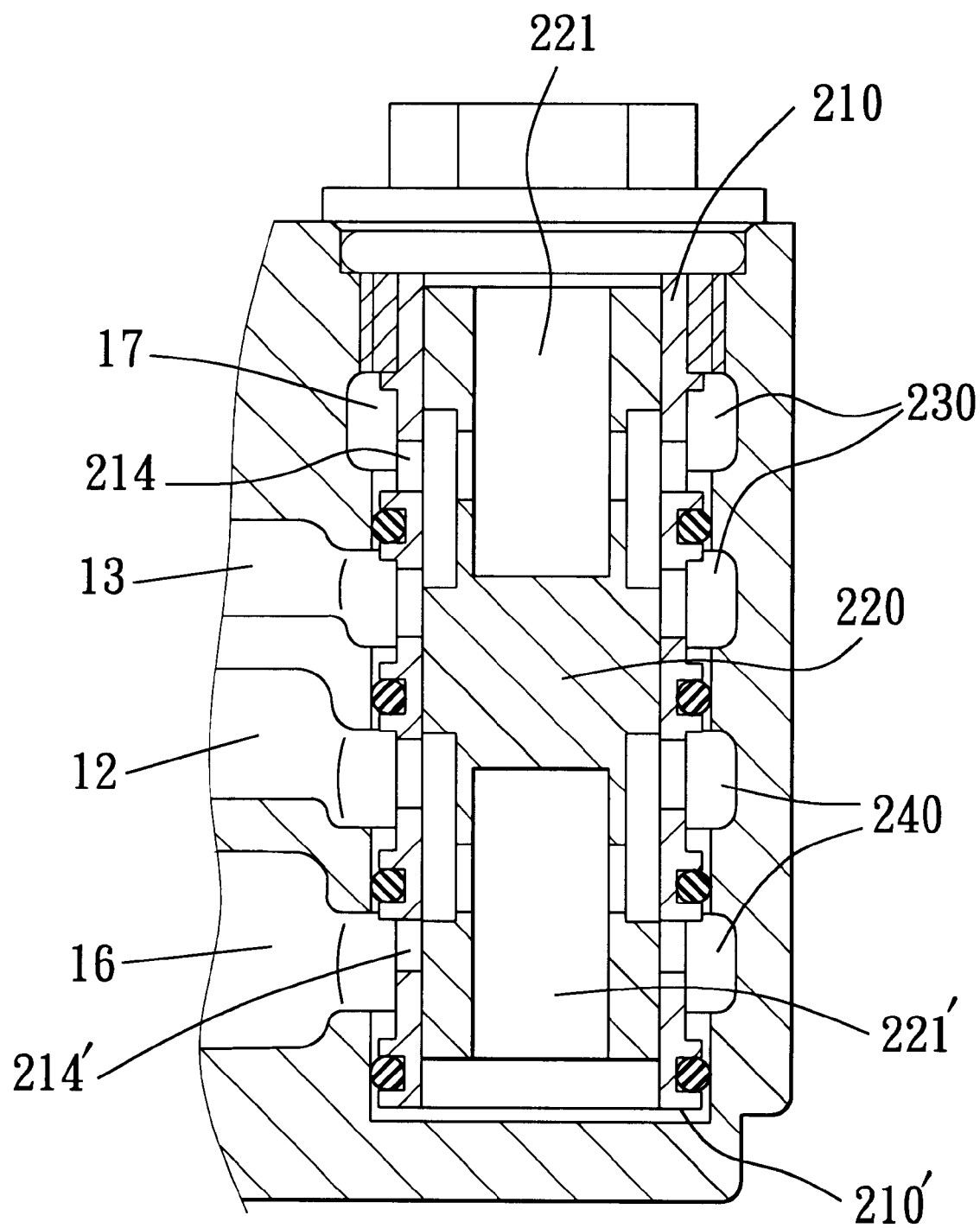
FIG. 5C is a sectional view of the pressure-stabilizing device of the preferred embodiment when the valve member is disposed at its upper limit position.
Figure 6A:
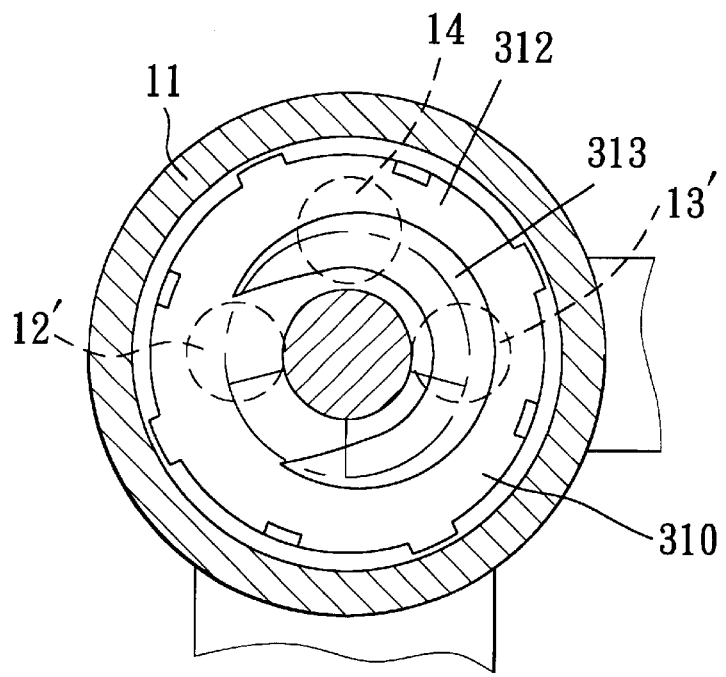
FIG. 6A is a schematic top view of a temperature adjustment device of the preferred embodiment, illustrating how it is operated to discharge cold water therefrom.
Figure 6B:
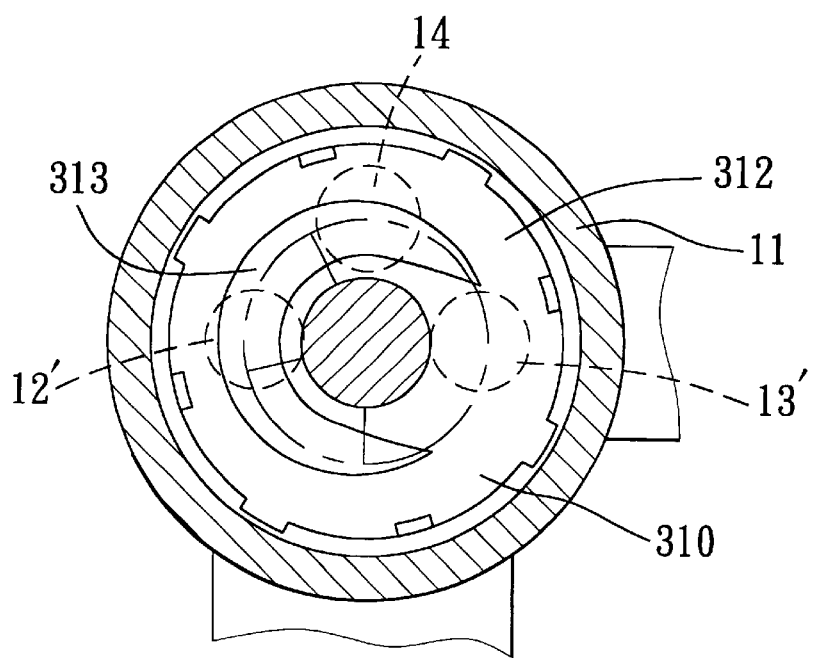
FIG. 6B is a schematic top view of the temperature adjustment device of the preferred embodiment, illustrating how it is operated to discharge hot water therefrom.

Similarly, when the water pressure in the cold-water input passage 17 is smaller than that in the hot-water input passage 16, the valve member 220 moves upward to engage the first end of the valve chamber 210' in the fixing tube 210, as shown in FIG. 5C. Under this condition, the engaging area between the valve member 220 and the upper one of the first opening units 214 in the fixing tube 210 is reduced. In addition, the valve member 220 engages all of the lower one of the second opening units 214' in the fixing tube 214. Accordingly, the valve member 220 is pushed by increased water pressure in the first bore 221 back to the equilibrating position shown in FIG. 5A. In this embodiment, the hot-water inlet 12', the cold-water inlet 13', and the water discharge port 14 are disposed in a triangular arrangement. Referring to FIG. 6A, the connecting passage 313 in the adjustment member 310 is generally U-shaped, and is gradually reduced in thickness from a middle thereof to two ends thereof. When it is desired to use cold water, the adjustment member 310 is rotated to the position shown in FIG. 6A, where the connecting passage 313 engages only the cold-water inlet 13' and the water discharge port 14. When it is desired to use hot water, the adjustment member 310 is rotated to the position shown in FIG. 6B, where the connecting passage 313 engages only the hot-water inlet 12' and the water discharge port 14. When it is desired to use warm water, the adjustment member 310 can be rotated to engage all of the hot-water inlet 12, the cold-water inlet 13, and the water discharge port 14. Rotation of the adjustment member 310 relative to the seat member 11 in two opposite directions permits respectively increase and decrease in the temperature of water flowing from the water discharge port 14. The rotational angle range of the adjustment member 310 relative to the seat member 11 is limited within 360 degrees, as described hereinafter.

Again referring to FIGS. 3 and 4, the seat member 11 of the temperature adjustment device 300 is fixed on the body 100, and has an upper end surface, which is formed with a cylindrical hole 11', in which the adjustment member 310 is disposed. The adjustment member 310 has an engagement post 311. The temperature adjustment device 300 further includes a vertical tubular sleeve 320, a vertical rotary tube 330, a ring 340, a temperature adjusting rotary knob 350, and a housing 360.

The sleeve 320 has an enlarged lower end portion that is press fitted within the cylindrical hole 11' in the seat member 11, and a central hole 321 that is formed through the sleeve 320 and that has a lower end portion 322 for extension of the engagement post 311 of the adjustment member 310 therein. An inner surface of the sleeve 320 is formed integrally with a radially and inwardly extending lower stop 323. An upper end surface of the sleeve 320 is formed with an upwardly extending upper stop 324.

The rotary tube 330 extends into the sleeve 320, and includes an engagement hole 331 that engages fittingly the engagement post 311 of the adjustment member 310 so as to rotate the adjustment member 310 synchronously therewith. In this embodiment, the engagement hole 331 has a cross-section with two opposite straight sides and two opposite curved sides. A lower end surface of the rotary tube 330 is formed with a downwardly extending lower stop 332. The lower stop 332 of the rotary tube 330 is rotatable within the sleeve 320 to engage the lower stop 323 of the sleeve 320, thereby preventing further rotation of the rotary tube 330 relative to the sleeve 320. The rotary tube 330 further has an upper end neck 333, and an annular toothed outer surface 334.

The rotary knob 350 is mounted rotatably on the housing 360 and around the sleeve 320, and is connected threadably to the upper end neck 333 of the rotary tube 330 for synchronous rotation with the rotary tube 330. The housing 360 is connected threadably to the seat member 11. The ring 340 has a ring body with an annular toothed inner surface 341 that engages the annular toothed outer surface 334 of the rotary tube 330 so as to rotate synchronously therewith, and an upper stop 342 that extends integrally, radially, and outwardly from the ring body and that is rotatable on the sleeve 320 to engage the upper stop 324 of the sleeve 320, thereby preventing further rotation of the rotary knob 350 relative to the seat member 11.

A showerhead unit 51' is coupled with the faucet end unit 51. The outlet selecting device 500 includes an outlet-selecting rotary knob 510, which is disposed rotatably between the faucet end unit 51 and the showerhead unit 51' in a known manner and which can be operated to discharge water from the faucet assembly through a selected one of the faucet end unit 51 and the showerhead unit 51'.

The flow-rate control device 400 includes a flow-rate adjusting rotary knob 410, which is disposed rotatably between the temperature adjustment device 300 and the outlet selecting device 500 in a known manner.

Figure 7:
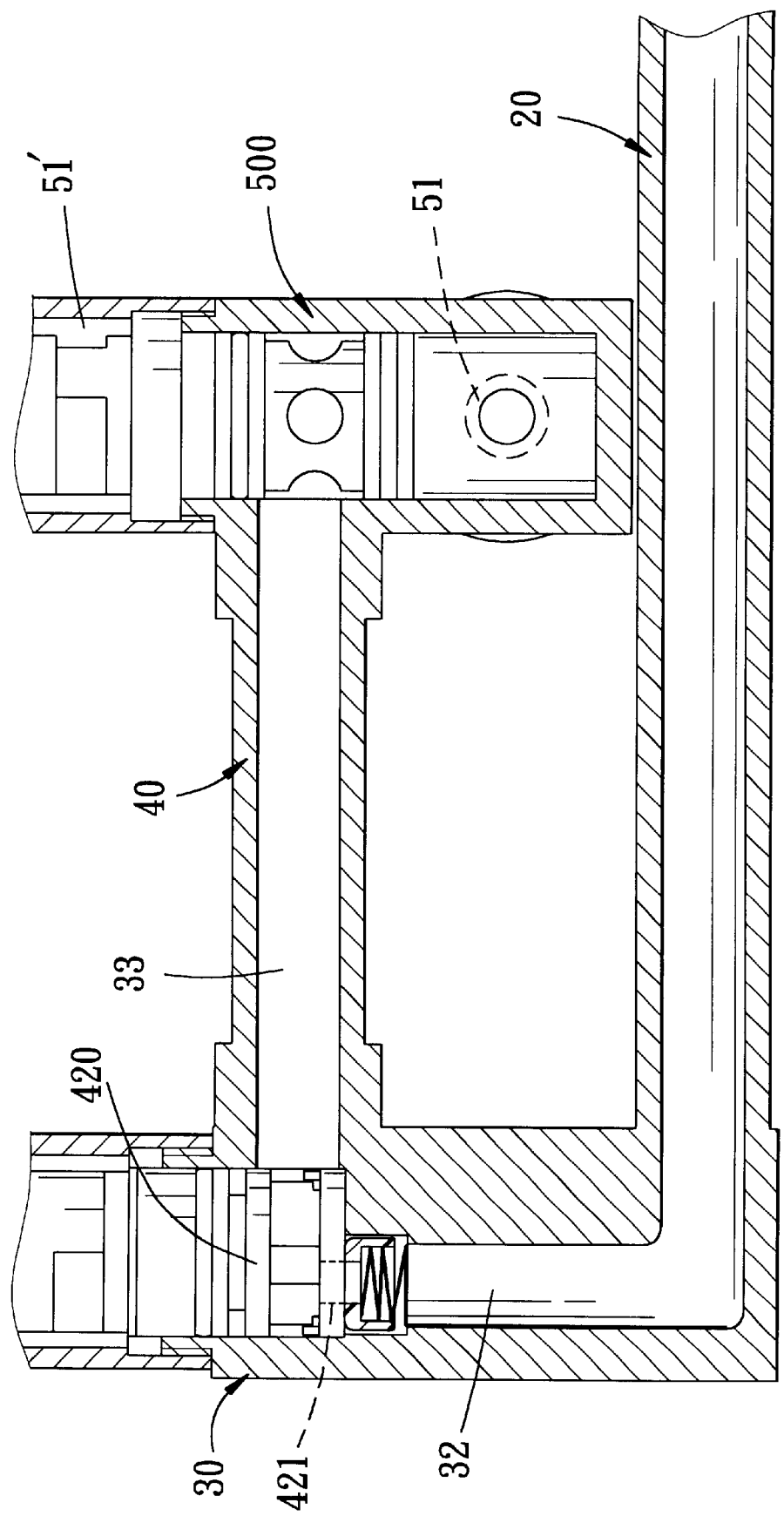
FIG. 7 is a schematic side view of the preferred embodiment, illustrating how a flow-rate control valve is operated to permit water flow therethrough at a maximum rate.
Figure 8:
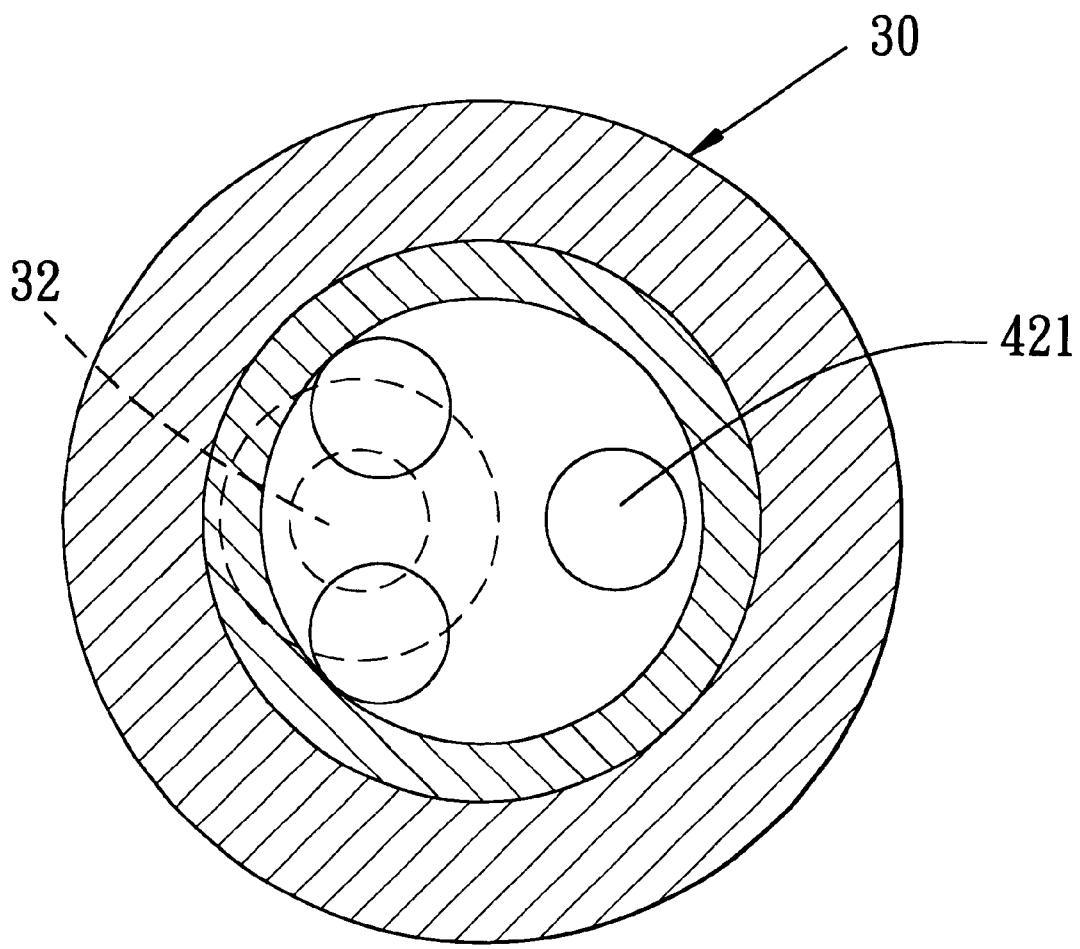
FIG. 8 is a schematic top view of the preferred embodiment, illustrating how the flow-rate control valve is operated to prevent water flow therethrough.

Referring to FIG. 7, the flow-rate control device 400 further includes a rotating member 420 that rotates synchronously with the flow-rate adjusting rotary knob 410 (see FIG. 3), and that has an interior passage 421 in fluid communication with the horizontal passage 33 in the upper horizontal conduit 40. The rotating member 420 can be rotated between a fully-open position shown in FIG. 7, where the interior passage 421 engages entirely the vertical passage 32 in the vertical conduit 30 so as to have a maximum flow rate, and a fully-closed position shown in FIG. 8, where the interior passage 421 is disengaged from the vertical passage 32 so as to stop water flow from the device 400 to the device 500.

Accordingly, the water temperature and flow rate of the faucet assembly of this invention can be controlled independently.

With this invention thus explained, it is apparent that numerous modifications and variations can be made without departing the scope and spirit of this invention. It is therefore intended that this invention be limited only as indicated by the appended claims.

I claim:

1. A faucet assembly comprising:
   a body having a cold-water input passage, a cold-water output passage, a hot-water input passage, and a hot-water output passage;
   a pressure-stabilizing device disposed between said cold-water input and output passages and between said hot-water input and output passages so that said cold-water and hot-water output passages have the same flow rate even when said cold-water and hot-water input passages have different water pressures;
   a temperature adjustment device including a seat member and an adjustment member, said seat member having a cold-water inlet in fluid communication with said cold-water output passage, a hot-water inlet in fluid communication with said hot-water output passage, and a water discharge port, said adjustment device being disposed rotatably relative to said seat member and being formed with a connecting passage, which is shaped so that rotation of said adjustment member relative to said seat member causes variation of engaging areas between said cold-water inlet and said connecting passage and between said hot-water inlet and said connecting passage, thereby permitting flow of a first predetermined amount of the cold water from said cold-water inlet to said water discharge port and a second predetermined amount of the hot water from said hot-water inlet to said water discharge port and consequently varying water temperature in said water discharge port;
   a faucet end unit in fluid communication with said water discharge port in said temperature adjustment device; and
   a flow-rate control valve disposed operatively between said temperature adjustment device and said faucet end unit for controlling flow rate of water from said water discharge port to said faucet end unit;
   wherein said body has a hollow vertical cylindrical portion with an inner surface that is formed with an adjacent pair of first inner annular grooves and an adjacent pair of second inner annular grooves, said first and second inner annular grooves in said cylindrical portion of said body being arranged one above another, and
   wherein said pressure-stabilizing device includes:
   a fixing tube fixed within said cylindrical portion and having a valve chamber therein which has a first end and a second end, a wall which is formed with two first opening units and two second opening units, and an outer surface, which is formed with an adjacent pair of first outer annular grooves and an adjacent pair of second outer annular grooves that are aligned and that are in fluid communication with said first and second inner annular grooves in said cylindrical portion of said body, respectively, so as to define an adjacent pair of first annular passage chambers and an adjacent pair of second annular passage chambers in such a manner that a liquid-tight seal is established between each adjacent pair of said first and second annular passage chambers, each of said first and second annular passage chambers being formed between said inner surface of said cylindrical portion of said body and said outer said outer surface of said fixing tube and being formed from one of said first and second outer annular grooves in said fixing tube and one of said first and second inner annular grooves in said cylindrical portion of said body, which are aligned with each other, said first and second opening units of said fixing tube being in fluid communication with said first and second annular passage chambers, respectively; and a cylindrical regulating valve member disposed movably within said valve chamber in said fixing tube and having an outer surface formed with a first outer annular groove and a second outer annular groove, said first annular passage chambers being in fluid communication with said first outer annular groove in said valve member via said first opening units in said fixing tube, respectively, said second annular passage chamber being in fluid communication said second outer annular groove in said valve member via said second opening units in said fixing tube, respectively, said cold-water input and output passages being communicated respectively and fluidly with said first annular passage chambers, said hot-water input and output passages being communicated respectively and fluidly with said second annular passage chambers, a first end surface that is formed with a cylindrical first bore, a second end surface that is formed with a cylindrical second bore, and a wall that is formed with a first opening unit and a second opening unit, said first and second bores being isolated fluidly from each other, said first bore being in fluid communication with said first outer annular groove in said valve member via said first opening unit in said valve member, said second bore being in fluid communication with said second outer annular groove in said valve member via said second opening unit in said valve member, said valve member being disposed at an equilibrating position, when said cold-water and hot-water input passages have the same water pressure, so that said cold-water and hot-water output passages have the same flow rate, said valve member being movable to engage said second end of said valve chamber in said fixing tube, when the water pressure in said cold-water input passage is larger than that in said hot-water input passage, so as to increase engaging area between said valve member and one of said first opening units in said fixing tube, which is in fluid communication with said cold-water input passage, and so as to reduce engaging area between said valve member and one of said second opening units in said fixing tube, which is in fluid communication with said hot-water input passage, thereby returning said valve member to said equilibrating position in view of the condition that the water pressure in said second bore is larger than that in said first bore when said valve member engages said second end said valve chamber, said valve member being movable to engage said first end of said valve chamber in said fixing tube, when the water pressure in said cold-water input passage is smaller than that in said hot-water input passage, so as to reduce engaging area between said valve member and one of said first opening units in said fixing tube, which is in fluid communication with said cold-water input passage, and so as to increase engaging area between said valve member and one of said second opening units in said fixing tube, which is in fluid communication with said hot-water input passage, thereby returning said valve member to said equilibrating position in view of the condition that the water pressure in said second bore is smaller than that in said first bore when said valve member engages said first end of said valve chamber.

2. A faucet assembly comprising:

a body having a cold-water input passage, a cold-water output passage, a hot-water input passage, and a hot-water output passage;

a pressure-stabilizing device disposed between said cold-water input and output passages and between said hot-water input and output passages so that said cold-water and hot-water output passages have the same flow rate even when said cold-water and hot-water input passages have different water pressures;

a temperature adjustment device including a seat member and an adjustment member, said seat member having a cold-water inlet in fluid communication with said cold-water output passage, a hot-water inlet in fluid communication with said hot-water output passage, and a water discharge port, said adjustment device being disposed rotatably relative to said seat member and being formed with a connecting passage, which is shaped so that rotation of said adjustment member relative to said seat member causes variation of engaging areas between said cold-water inlet and said connecting passage and between said hot-water inlet and said connecting passage, thereby permitting flow of a first predetermined amount of the cold water from said cold-water inlet to said water discharge port and a second predetermined amount of the hot water from said hot-water inlet to said water discharge port and consequently varying water temperature in said water discharge port;

a faucet end unit in fluid communication with said water discharge port in said temperature adjustment device; and a flow-rate control valve disposed operatively between said temperature adjustment device and said faucet end unit for controlling flow rate of water from said water discharge port to said faucet end unit;

wherein said cold-water inlet, said hot-water inlet, and said water discharge port are disposed in a triangular arrangement, said connecting passage in said adjustment member of said temperature adjustment device being generally U-shaped and being gradually reduced in thickness from a middle thereof to two ends thereof.

3. A faucet assembly comprising:
- a body having a cold-water input passage, a cold-water output passage, a hot-water input passage, and a hot-water output passage;
- a pressure-stabilizing device disposed between said cold-water input and output passages and between said hot-water input and output passages so that said cold-water and hot-water output passages have the same flow rate even when said cold-water and hot-water input passages have different water pressures;
- a temperature adjustment device including a seat member and an adjustment member, said seat member having a cold-water inlet in fluid communication with said cold-water output passage, a hot-water inlet in fluid communication with said hot-water output passage, and a water discharge port, said adjustment device being disposed rotatably relative to said seat member and being formed with a connecting passage, which is shaped so that rotation of said adjustment member relative to said seat member causes variation of engaging areas between said cold-water inlet and said connecting passage and between said hot-water inlet and said connecting passage, thereby permitting flow of a first predetermined amount of the cold water from said cold-water inlet to said water discharge port and a second predetermined amount of the hot water from said hot-water inlet to said water discharge port and consequently varying water temperature in said water discharge port;
- a faucet end unit in fluid communication with said water discharge port in said temperature adjustment device;
- a flow-rate control valve disposed operatively between said temperature adjustment device and said faucet end unit for controlling flow rate of water from said water discharge port to said faucet end unit; and
- means for limiting rotational angle range of said adjustment member relative to said seat member within 360 degrees, rotation of said adjustment member relative to said seat member in two opposite directions permitting respectively increase and decrease in temperature of water flowing from said water discharge port.

4. A faucet assembly comprising:
- a body having a cold-water input passage, a cold-water output passage, a hot-water input passage, and a hot-water output passage;
- a pressure-stabilizing device disposed between said cold-water input and output passages and between said hot-water input and output passages so that said cold-water and hot-water output passages have the same flow rate even when said cold-water and hot-water input passages have different water pressures;
- a temperature adjustment device including a seat member and an adjustment member, said seat member having a cold-water inlet in fluid communication with said cold-water output passage, a hot-water inlet in fluid communication with said hot-water output passage, and a water discharge port, said adjustment device being disposed rotatably relative to said seat member and being formed with a connecting passage, which is shaped so that rotation of said adjustment member relative to said seat member causes variation of engaging areas between said cold-water inlet and said connecting passage and between said hot-water inlet and said connecting passage, thereby permitting flow of a first predetermined amount of the cold water from said cold-water inlet to said water discharge port and a second predetermined amount of the hot water from said hot-water inlet to said water discharge port and consequently varying water temperature in said water discharge port;
- a faucet end unit in fluid communication with said water discharge port in said temperature adjustment device;
- a flow-rate control valve disposed operatively between said temperature adjustment device and said faucet end unit for controlling flow rate of water from said water discharge port to said faucet end unit; and
- means for limiting rotational angle range of said adjustment member relative to said seat member within 360 degrees, rotation of said adjustment member relative to said seat member in two opposite directions permitting respectively increase and decrease in temperature of water flowing from said water discharge port;
- wherein said seat member of said temperature adjustment device is fixed on said body, and has an upper end surface, which is formed with a cylindrical hole, in which said adjustment member is disposed, said adjustment member having an engagement post, said temperature adjustment device further including:
  - a vertical tubular sleeve having a lower end portion that is press fitted within said cylindrical hole in said seat member, a central hole that is formed through said sleeve and that has a lower end for extension of said engagement post of said adjustment member therein, an inner surface that is formed with a radially and inwardly extending lower stop, and an upper end surface that is formed with an upwardly extending upper stop;
  - a vertical rotary tube extending into said sleeve and including an engagement hole that engages fittingly said engagement post of said adjustment member so as to rotate said adjustment member synchronously therewith, a lower end surface that is formed with a downwardly extending lower stop, an upper end neck, and an annular toothed outer surface, said lower stop of said rotary tube being rotatable within said sleeve to engage said lower stop of said sleeve, thereby preventing further rotation of said rotary tube relative to said sleeve;
  - a housing disposed fixedly on said seat member;
  - a temperature adjusting rotary knob mounted rotatably on said housing and around said sleeve and connected fixedly to said upper end neck of said rotary tube for synchronous rotation with said rotary tube; and
  - a ring having a ring body with an annular toothed inner surface that engages said annular toothed outer surface of said rotary tube so as to rotate synchronously therewith, and an upper stop that extends integrally, radially, and outwardly from said ring body and that is rotatable on said sleeve to engage said upper stop of said sleeve, thereby preventing further rotation of said rotary knob relative to said seat member, said upper stops of said ring and said sleeve and said lower stops of said rotary tube and said sleeve constituting said means for limiting rotational angle range.

5. The faucet assembly as claimed in claim 1, further comprising:
- a showerhead unit coupled said faucet end unit; and
- an outlet selecting rotary knob disposed rotatably between said faucet end unit and said showerhead unit for discharging water from said faucet assembly through a selected one of said faucet end unit and said showerhead unit; and wherein said flow-rate control valve includes a flow-rate adjusting rotary knob disposed rotatably between said faucet end unit and said temperature adjustment device for controlling flow rate of water from said temperature adjustment device to said faucet end unit.

* * * * *